(12) United States Patent
Asakura et al.

(10) Patent No.: US 6,744,478 B1
(45) Date of Patent: Jun. 1, 2004

(54) HEADS-UP DISPLAY SYSTEM WITH OPTICAL ROTATION LAYERS

(75) Inventors: Motoh Asakura, Mie (JP); Kenji Hosaki, Yokohama (JP)

(73) Assignees: Central Glass Company, Limited, Yamaguchi (JP); Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/470,976

(22) Filed: Dec. 23, 1999

(30) Foreign Application Priority Data

Dec. 28, 1998 (JP) .......................................... 10-372523

(51) Int. Cl.⁷ ............................................. G02F 1/1335
(52) U.S. Cl. ............................................. 349/11; 349/9
(58) Field of Search ........................ 349/9, 11; 359/487

(56) References Cited

U.S. PATENT DOCUMENTS

| | | | | |
|---|---|---|---|---|
| 5,398,127 A | * | 3/1995 | Kubota et al. ................ | 359/75 |
| 5,510,913 A | * | 4/1996 | Hashimoto et al. ........... | 359/37 |
| 5,999,314 A | * | 12/1999 | Asakura et al. .............. | 359/487 |
| 6,259,559 B1 | * | 7/2001 | Kobayashi et al. ......... | 359/485 |

FOREIGN PATENT DOCUMENTS

| | | |
|---|---|---|
| JP | 2-141720 | 5/1990 |
| JP | 2-294615 | 12/1990 |
| JP | 6-40271 | 2/1994 |

* cited by examiner

*Primary Examiner*—Robert H. Kim
*Assistant Examiner*—Andrew Schechter
(74) *Attorney, Agent, or Firm*—Crowell & Moring LLP

(57) ABSTRACT

A head-up display system comprising a transparent plate. A liquid crystal display generates a display light of information with a plane of polarization inclined by about 45° relative to an image plane vertical axis. A first optical rotation layer is disposed on a first surface of the transparent plate, and receives the display light from the liquid crystal display and optically rotates the plane of polarization of the display light by about 90°. A second optical rotation layer is between the image plane of the liquid crystal display and a second surface of the transparent plate, and optically rotates the plane of polarization of the display light by about 45° and allows S-polarized light to emanate toward the transparent plate at Brewster's angle. The S-polarized light is reflected on the second surface and is directed toward an eye of an operator.

2 Claims, 3 Drawing Sheets

HEADS-UP DISPLAY SYSTEM WITH OPTICAL ROTATION LAYERS

BACKGROUND OF THE INVENTION

1. Field of the Invention

This invention relates to improvements in a display system for optically projecting a display light of information to be observed by a person from a liquid crystal display as a display device, and more particularly to the display system such as a head-up display system which is configured, for example, such that an operator and the like can observe an image of driving information projected as the display light on a windshield glass or on a combiner provided on the windshield glass while looking a frontal view through the windshield glass in such a manner that the driving information is superimposed on the frontal view, in a vehicle or a ship, or the like display system for architecture.

2. Description of the Prior Art

A variety of head-up display systems of an automotive vehicle have been hitherto proposed and put into practical use. A typical head-up display system is constituted by directly applying a film functioning as a half mirror on a windshield glass, or by interposing the half mirror between two glass plates. However, with this head-up display system, reflection of light of an image is unavoidably made on the front-side or rear-side surface of the glass plate thereby forming a double image which is difficult to be observed by a driver. In view of this, another types of the head-up display system have been proposed, in which light of the image is reflected from the surface of the glass plate without using the half mirror in order to avoid formation of the double image. One of these is configured by applying a so-called λ/2 film (for changing a direction of polarization of light) on a transparent plate such as a glass plate, as disclosed in Japanese Patent Provisional Publication No. 2-141720 Another one is configured by bonding a transparent film having birefringence on a transparent plate, as disclosed in Japanese Patent Provisional Publication No. 2-294615. A further one is configured by bonding a optical rotation layer formed of a crystalline high polymer on a transparent plate, as disclosed in Japanese Patent Provisional Publication No. 6-40271. Additionally, some of the inventors of this application have proposed a display system including a combination of an optical rotation film, a light-transmittable reflection film and an antireflection film, as disclosed in a United States Patent Application No. 08/621379 entitled "Glass Arrangement".

The above display systems usually employs a fluorescent display tube or a liquid crystal display as the displaying device for generating the display light of information to be incident on the glass plate.

However, widely used liquid crystal displays except for some small-sized televisions using a liquid crystal display are so set that the axis (plane) of polarization is generally oblique relative to a vertical axis and a horizontal axis of the image plane of the liquid crystal display, i.e., generally along a diagonal line of the image plane in order to keep a bilateral symmetry of angle of visibility. Accordingly, it is impossible to prevent formation of the double image by using the conventional optical rotation film capable of rotating the plane of polarization about 90°. In order to prevent formation of the double image, it is required to use a small-sized liquid crystal display having an axis (plane) of polarization vertical or horizontal in the image plane of the liquid crystal display, or to use a specially prepared liquid crystal display whose axis of polarization is adjusted only corresponding to the display system.

SUMMARY OF THE INVENTION

Brief Summary of the Invention

It is an object of the present invention to provide an improved display system which can effectively overcome drawbacks encountered in conventional display systems such as a head-up display system.

Another object of the present invention is to provide an improved display system which is simple in construction and can effectively prevent formation of a double image to be recognized by an operator, even by using a usual liquid crystal display whose axis (plane) of polarization is inclined about 45° relative to a vertical axis on the image plane of the liquid crystal display.

An aspect of the present invention resides in a display system, comprising a transparent plate. A liquid crystal display is provided for generating a display light of information. The display light has a plane of polarization inclined by an angle of about 45° relative to a vertical axis of an image plane of the liquid crystal display. A first optical rotation layer is disposed on a first surface of the transparent plate. The optical rotation layer is adapted to receive the display light from the liquid crystal display and to optically rotate the plane of polarization of the display light by an angle of about 90°. A second optical rotation layer is disposed between the image plane of the liquid crystal display and a second surface of the transparent plate. The optical rotation layer is adapted to optically rotate the plane of polarization of the display light from the liquid crystal display by an angle of about 45° and to allow S-polarized light to emanate toward the transparent plate at Brewster's angle. The S-polarized light is reflected on a side of the second surface of the transparent plate to be directed toward an eye of an operator.

Another aspect of the present invention resides in a display system comprising a transparent plate. A liquid crystal display is provided for generating a display light of information. The display light has a plane of polarization inclined by an angle of about 45° relative to a vertical axis of an image plane of the liquid crystal display. A first optical rotation layer is disposed to a second surface of the transparent plate. The optical rotation layer is adapted to optically rotate the plane of polarization of the display light incident thereon by an angle of about 90°. The display light from the first optical rotation layer is reflected on the second surface of the transparent plate and directed toward an eye of an operator. Additionally, a second optical rotation layer is disposed between the image plane of the liquid crystal display and a second surface of the transparent plate. The second optical rotation layer is adapted to optically rotate the plane of polarization of the display light from liquid crystal display by an angle of about 45° and to allow P-polarized light to outgo toward the first optical rotation layer at Brewster's angle.

A further aspect of the present invention resides in a display system comprising a transparent plate. A liquid crystal display is provided for generating a display light of information. The display light has a plane of polarization inclined by an angle of about 45° relative to a vertical axis of an image plane of the liquid crystal display. The display light is incident on a second surface of the transparent plate at Brewster's angle and reflected on a side of the second surface of transparent plate to be directed to an eye of an operator. An optical rotation layer is disposed to a first surface of the transparent plate. The optical rotation layer is adapted to receive the display light from the liquid crystal display and to optically rotate the plane of polarization of the display light from the liquid crystal display by an angle of about 45° and to allow P-polarized light to outgo therefrom.

BRIEF DESCRIPTION OF THE DRAWINGS

In the drawings, like reference numerals designate like parts and elements throughout all figures, in which.

DETAILED DESCRIPTION OF THE INVENTION

Figure 1:
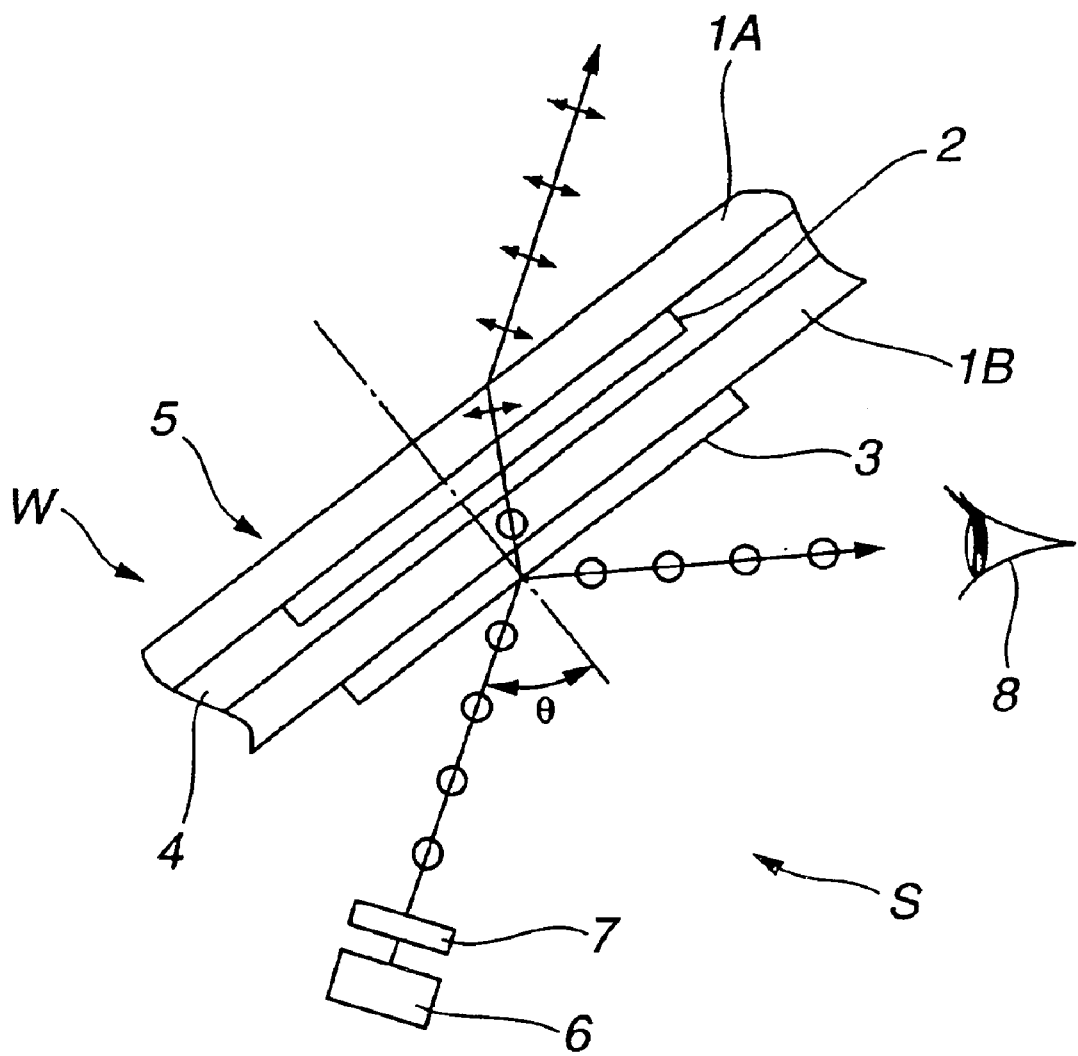
FIG. 1 is a fragmentary schematic sectional view of a first embodiment of a display system according to the present invention.

Referring now to FIG. 1 of the drawings, a first embodiment of a display system according to the present invention is illustrated by the reference character S. The display system S of this embodiment is a head-up display system and constituted by incorporating optical rotation (polarization-direction changing) layer or films 2, 7. The optical rotation layers 2, 7 are adapted to change the direction of polarization of light to be incident thereon, i.e., to rotate a plane of polarization of light to be incident thereon. The optical rotation layers 2, 7 in this embodiment are formed of a liquid crystal polymer which is in twisted nematic orientation under a liquid crystal condition and is in a glassy state at a temperature lower than liquid crystal transition point thereof.

The optical rotation (polarization-direction changing) layers 2, 7 are formed as follows: The liquid crystal polymer is coated on a transparent substrate (substrate film) such as a plastic film formed of, for example, polyethylene terephthalate (PET). Then a shearing force is applied to the liquid crystal polymer, and thereafter the liquid crystal polymer is subjected to heat-treatment and then cooling so that a liquid crystal orientation is fixed. Thus, the optical rotation layer 2 is formed on the surface of the substrate film.

In this embodiment, the liquid crystal polymer is one represented by the following chemical formula:

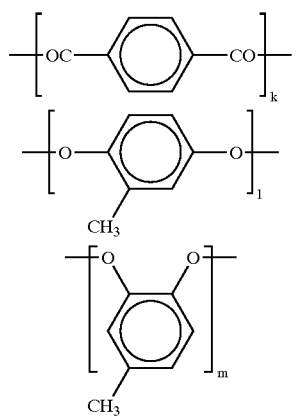

-continued

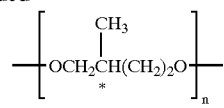

where k=1+m+n; k/n=99.9/0.1 to 90/10, preferably 99.7/0.3 to 95/5; 1/m=5/95 to 95/5; and a symbol * in the formula represents optically active carbon.

The above liquid crystal polymer can be formed into the first and second optical rotation layers 2, 7 by controlling a content of optically active unit components in the liquid crystal polymer, a thickness of the liquid crystal polymer, conditions of the heat-treatment for causing the liquid crystal polymer to exhibit a crystalline characteristics, and the like. The first optical rotation layers can rotate a plane of polarization of light to be incident thereon by an angle of about 90°. The second optical rotation layer can rotate a plane of polarization of light to be incident thereon by an angle of about 45°.

The thus formed optical rotation layer 2 is removed from the substrate film and then bonded to the inboard surface of an outboard-side glass plate (transparent plate) 1A forming part of a front windshield glass W, with a tape-like adhesive (not shown).

A light-transmittable reflection film or layer 3 is formed at a part of the inboard surface of an inboard-side glass plate (transparent plate) 1B forming part of the front windshield glass W, under deposition of a metal thin film formed of Al, Au, Ag, Cu or the like deposition of the.

Thereafter, the inboard-side glass plate 1B is temporarily bonded at its outboard surface to the inboard surface of the outboard-side glass plate 1A with an intermediate film or layer 4 (made of polyvinyl butyral or the like), so that the optical rotation layer 2 is located between the outboard-side glass plate 1A and the inboard-side glass plate 1B in such a manner that the optical rotation layer 2 is separate from the outboard-side surface of the inboard-side glass plate 1B, as clearly shown in FIG. 1. The inboard-side glass plate 1B defines thereinside a passenger compartment in which a driver (operator) and/or a vehicle passenger reside. It will be understood that a layer of the intermediate film 4 lies between the optical rotation layer 2 and the inboard-side glass plate 1B. Such a temporarily bonded structure is then subjected to a usual autoclave treatment, thereby obtaining a laminated glass 5 used for the automotive vehicle front windshield glass W.

The above-discussed laminated glass 5 is used as the automotive vehicle windshield glass W and forms part of the head-up display system S. The head-up display system S includes a displaying device or liquid crystal display 6. The displaying device 6 generates a display light of information such as a driving information or the like. For example, the liquid crystal display 6 has an axis (plane) of polarization inclined 45° rightward relative to a vertical axis on the image plate of the display 6. The second optical rotation layer 7 is attached or bonded on the front surface of the display 6 so as to rotate the plane of-rotation of light from the display 6 by about 45° leftward, thereby transmitting S-wave having an axis (plane) of polarization inclined about 45° relative to the polarization axis on the image plane of the display 6, at Brewster's angle (θ=about 56°) to the front windshield glass W. The S-wave has a direction of electric field, perpendicular to the surface of the inboard-side glass plate 1B.

With the thus arranged display system S, first display information or display light of information whose polarization axis (plane) is inclined about 45° rightward relative to the vertical axis on the image plate of the display 6 is output and incident on the second optical rotation layer 7 so as to be optically rotated by about 45° leftward to form S-wave. This S-wave reaches the inboard-side glass 1B, in which a part of the display light is reflected on the light-transmittable reflection layer 3 and reaches an eye 8 of an operator or driver so that the display information is clearly recognized by the operator.

Another part of the display light (S-wave) entering the laminated glass 5 without reflection reaches the first optical rotation layer 2 to be optically rotated into P-wave. Then, this P-wave reaches and outgoes to the inboard surface of the outboard-side glass plate 1A at Brewster's angle, so that P-wave can be prevented from being reflected to the side of the eye 8 by the inboard surface of the outboard-side glass plate 1A. As a result, a whole amount of P-wave outgoes to the outboard side of the glass plate 1A without being reflected toward the eye 8 of the operator.

It will be understood that the light-transmittable reflection layer 3 is not necessarily required since light can be reflected by the inboard surface of the inboard-side glass plate 1B; however, an amount of light to be reflected to the side of the eye 8 will be reduced.

Hereinafter, constituents of the display system S of the present invention will be discussed in connection with the above embodiment.

While only the liquid crystal polymer represented by the above chemical formula has been described as being used as the first and second optical rotation layers 2, 7, the liquid crystal polymer as the material of the first and second rotation layers 27 will be discussed.

Each of the optical rotation (polarization-direction changing) layers 2, 7 are formed in the following manner: The liquid crystal polymer is coated on a transparent substrate (substrate film) such as a plastic film formed of, for example, polyethylene terephthalate (PET). Then a shearing force, an electric field, or a magnetic field is applied to the liquid crystal polymer, and thereafter the liquid crystal polymer is subjected to heat-treatment and then cooling so that the orientation of the liquid crystal polymer is fixed. Thus, the optical rotation layer 2 is formed on the surface of the substrate film.

Otherwise, the optical rotation layer 2 is formed in the following manner: A oriented film is formed on a transparent substrate (substrate film). The oriented film is rubbing polyimide film, rubbing polyvinyl alcohol film, or a film formed by depositing silicon oxide on the substrate. A liquid crystal polymer is coated on the oriented film, and then subjected to heat-treatment and then cooling so that the orientation of the liquid crystal polymer is fixed.

It will be understood that the liquid crystal polymer itself may be used as the optical rotation layers 2, 7 without the transparent substrate, after its orientation is fixed in the above manner.

The optical rotation layers 2, 7 used in the display system S have a thickness ranging from 0.5 to 20 μm, and preferably 1 to 15 μm.

An optical rotation angle at which the plane of polarization of light is rotated or changed under the effect of the optical rotation layer can be regulated by controlling a content of optically active unit components in the liquid crystal polymer, a thickness of the liquid crystal polymer, conditions of the heat-treatment for causing the liquid crystal polymer to exhibit a crystalline characteristics, and the like. The first optical rotation layer 2 has the optical rotation angle of about 90°. The second optical rotation layer 7 has an optical rotation angle of about 45°.

The liquid crystal polymer to be used as the optical rotation layer of the display system S is in twisted nematic orientation under a liquid crystal condition and is in a glassy state at a temperature lower than liquid crystal transition point thereof. Examples of the liquid crystal polymer are a main-chain type polymer such as optically active polyester, polyamide, polycarbonate, and polyesterimide, and a side-chain type polymer such as optically active polyacrylate, polymethacrylate, polymalonate, and polysiloxane. Additionally, the liquid crystal polymer to be used as the optical rotation layer may be a polymer composition which is prepared by adding optically active polymers to such main-chain type polymer or side-chain type polymer which is optically inactive.

Concrete examples of the liquid crystal polymer to be used as the optical rotation layer are polymers represented by the chemical formulae (1) to (7) discussed below. All these polymers have a glass transition point (temperature) ranging from 0° C. to 150° C., and are in twisted nematic orientation at a temperature higher than the glass transition point and is in a glassy state at a temperature lower than the glass transition point. The examples of the polymers are as follows:

A polymer represented by the following chemical formula (1):

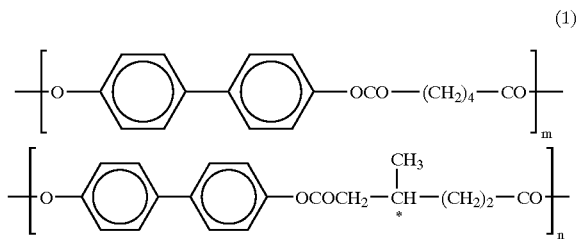

where n/m=99.9/0.1 to 70/30, preferably 99.8/0.2 to 90/10, more preferably 99.7/0.3 to 95/5; and a symbol * in the formula represents optically active carbon (this is common in the formulae shown below).

A polymer represented by the following chemical formula (2):

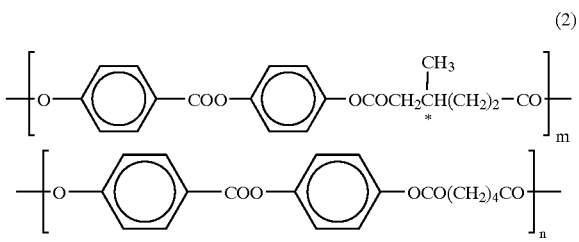

where m/n=0.1/99.9 to 10/90, preferably 0.3/99.7 to 5/95.

A polymer represented by the following chemical formula (3):

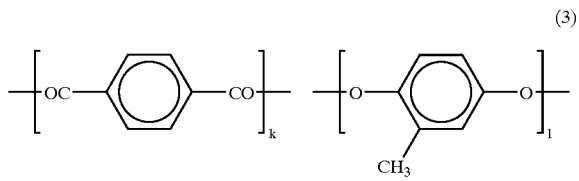

-continued

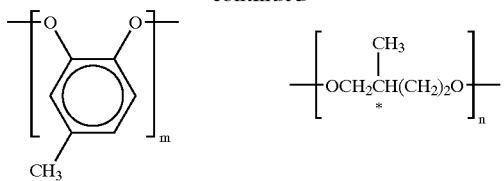

where k=1+m+n; k/n=99.9/0.1 to 90/10, preferably 99.7/0.3 to 95/5; and l/m=5/95 to 95/5.

A polymer represented by the following chemical formula (4):

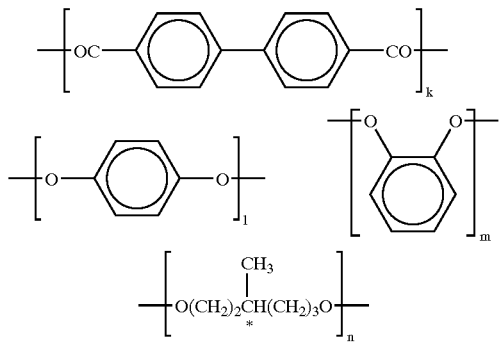

(4)

where k=1+m+n; k/n=99.9/0.1 to 90/10, preferably 99.7/0.3 to 95/5; and l/m=5/95 to 95/5.

A mixture represented by the following formulae (5), of a first polymer represented by a chemical formula (A) and a second polymer represented by a chemical formula (B):

(5)

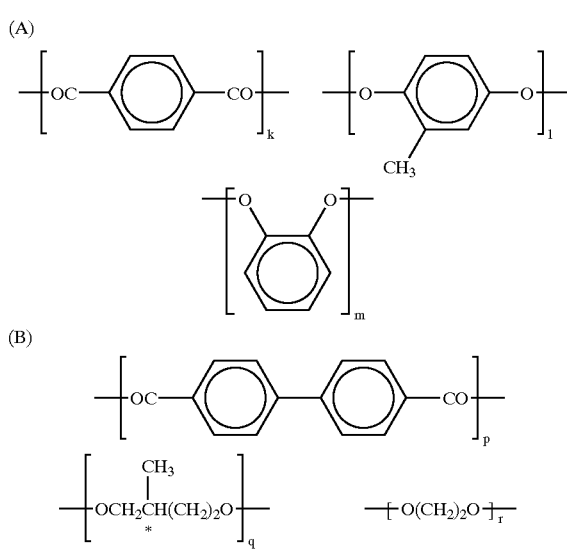

where a weight ratio (A)/(B)=99.9/0.1 to 80/20, preferably 99.8/0.2 to 90/10, more preferably 99.7/0.3 to 95/5; k=1+m, l/m=75/25 to 25/75; p=q+r; and q/r=80/20 to 20/80.

A mixture represented by the following formulae (6) of a polymer represented by a chemical formula (A) and a compound (B):

(A)

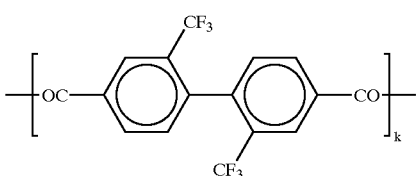

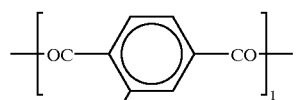

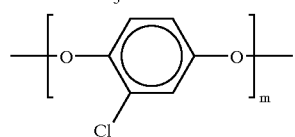

(B) CHOLESTERYL BENZOATE   (6)

where a weight ratio (A)/((B)=99.9/0.1 to 70/30, preferably 99.8/0.2 to 80/20, more preferably 99.7/0.3 to 90/10; m=k+1; and k/l 80/20 to 20/80.

A mixture represented by the following chemical formulae (7), of a first polymer represented by a chemical formula (A) and a second polymer represented by a chemical formula (B):

(7)

(A)

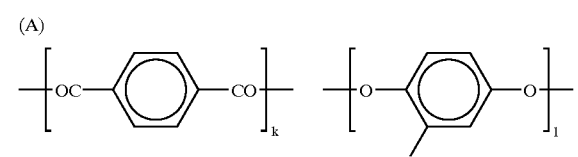

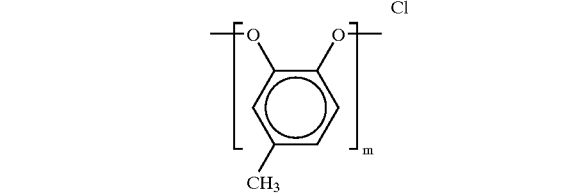

(B)

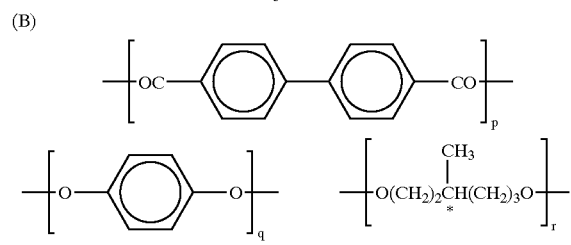

where a weight ratio (A)/(B)=99.9/0.1 to 70/30, preferably 99.8/0.2 to 80/20, more preferably 99.7/0.3 to 90/10; K=1+m; l/m=25/75 to 75/25; p=q+r; and q/r=20/80 to 80/20.

The above polymers have an inherent viscosity relating to a molecular weight is preferably within a range of from 0.05 to 3.0 (dl/g), more preferably within a range of from 0.07 to 2.0 (dl/g), in which the inherent viscosity being measured at 30° C. by using a variety of solvents such as tetrahydrofuran, acetone and a mixture solvent of phenol/tetrachloroethane (60/40). If the inherent viscosity is lower than 0.05, resultant liquid crystal polymer is lowered in strength. If the inherent viscosity is higher than 3.0, the viscosity of a material during formation of liquid crystal becomes too high, thereby degrading formation of liquid crystal orientation and requires a long time for formation of liquid crystal orientation.

In the display system S, when the display light of information from the side of the liquid crystal display 6 is incident on the transparent plate or glass plate 1B at Brewster's angle, the display light may be S-wave (S-polarized light) having a direction of electric field perpendicular to the surface plane of incidence) of the glass plate, or P-wave (P-polafized light) having a direction of electric field parallel with the surface (plane of incidence) of the glass plate 1B; however, S-wave is preferable because reflection on the outer-most or inboard-most layer can be effectively made so as to increase an amount of the light reflected toward the eye 8 as compared with P-wave.

The plane (axis) of polarization of the liquid crystal display is inclined about 45° relative to the vertical axis of the image plane of the liquid crystal display, in which it may be inclined about 45° rightward or about 45° leftward. In case of being inclined 45° rightward, the display light of information from the liquid crystal display is converted into S-wave by using the second optical rotation layer 7 which rotates the plane of polarization about 45° leftward, so as to be incident on the glass plate 1B. Otherwise, the display light of information from the liquid crystal display is converted into P-wave by using the second optical rotation layer 7 which rotates the plane of polarization about 45° rightward, so as to be incident on the glass plate 1B.

In case of being inclined about 45° leftward, the display light of information from the liquid crystal display becomes S-wave by using the second optical rotation layer 7 which rotates the plane of polarization about 45° rightward, so as to be incident on the glass plate 1B. Otherwise, the display light of information from the liquid crystal display becomes P-wave by using the second optical rotation layer 7 which rotates the plane of polarization about 45° leftward, so as to be incident on the glass plate 1B.

It is preferable to use the light-transmittable reflection layer 3 to reflect the display light of information from the liquid crystal display 6 thereby to increase the amount of the display light to be reflected toward the eye 8 as-compared with a case where the display light is reflected on a surface or the inboard surface of the glass plate 1B. However, the display light may be reflected directly on a surface or the inboard surface of the glass plate 1B without using the light-transmittable reflection layer 3.

In case of using the light-transmittable reflection layer 3, in order that the display light is incident on the glass plate 1B as S-wave, the layer 3 is to be provided on the inboard-most surface of the glass plate 1B on the side of the liquid crystal display 6. In order that the display light is incident on the glass plate 1B as P-wave, the light-transmittable reflection layer 3 is to be provided on the outboard-most surface of the glass plate 1A which surface is on the opposite side of the liquid crystal display 6.

While the display system S of the embodiments has been shown and described as including one or two (inorganic) glass plates, it will be understood that the glass plates may be replaced with a single transparent plate or two transparent plates, in which each transparent plate is made of a transparent organic glass plate such as a transparent plastic plate. Otherwise, the two transparent plates may be an inorganic glass plate and an organic glass plate, respectively.

The display system S of the embodiments has been shown and described as the head-up display system including an automotive vehicle front windshield glass, it will be understood that the display system S may include other window glasses of the automotive vehicle so as to form a combiner, or includes a single glass plate (separate from the windshield glass or window glass) so as to form a separate combiner. Additionally, the display system S may includes architectural glass or a partition wall glass so as to display a variety of information.

In case that the display system S includes a vehicular (for example, automotive vehicle) windshield glass (laminated glass), it is preferable to bond the optical rotation layer 2 onto the inboard surface of the outboard-side glass plate 1A from the view point of improving so-called impact and penetration resistance of the windshield glass. The impact resistance is improved because a part (in contact with the optical rotation layer 2) of the outboard-side glass cannot drop into the passenger compartment even when the windshield glass is broken, though the part is low in bonding strength as compared with the other parts in contact with the intermediate film 4 made of polyvinyl butyral. Additionally, it is preferable to bond the optical rotation layer 2 onto the outboard surface of the inboard-side glass plate 1B from the view point of improving durability of the optical rotation layer 2 because sun light reaches the optical rotation layer through the intermediate film (polyvinyl butyral) so that ultraviolet ray can be absorbed by the intermediate film to some extent.

The optical rotation layer 2 has been shown and described as being formed of the liquid crystal polymer which is in twisted nematic orientation under liquid crystal condition and is in glassy state at a temperature lower than a liquid crystal transition point thereof. This is preferable from the view point of preventing double image from being formed throughout a whole visible region. However, it will be appreciated that the above-type of the optical rotation layer may be replaced with other types of optical rotation films such as a transparent film having a birefringence, and a so-called $\lambda/2$ film or layer.

Figure 2:
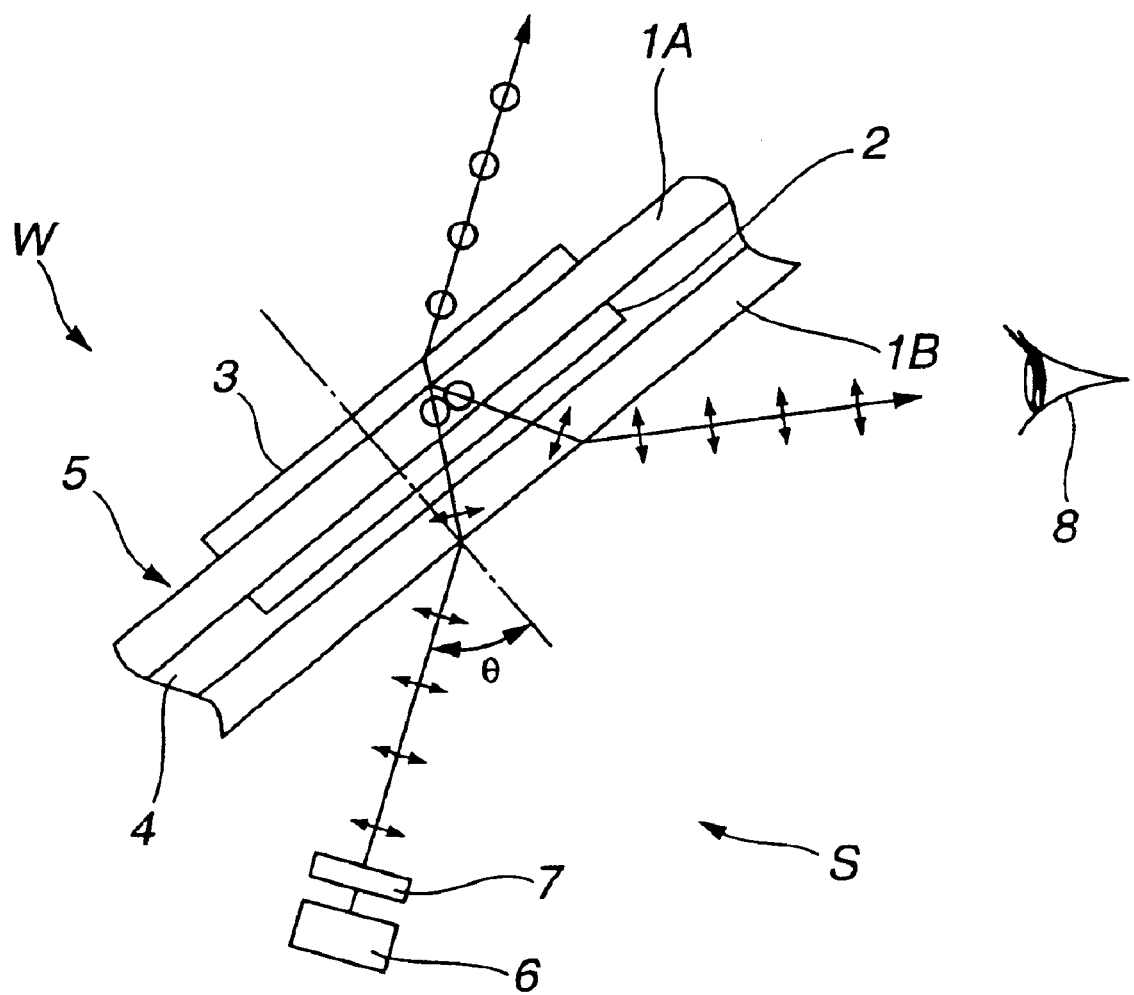
FIG. 2 is a fragmentary schematic sectional view of a second embodiment of the display system according to the present invention.

FIG. 2 illustrates a second embodiment of the display system S according to the present invention, similar to the first embodiment shown in FIG. 1. In this embodiment, the optical rotation layer 2 (capable of rotating the plane of polarization of light by about 90° to be incident thereon) formed in the same manner as in the first embodiment is removed from the substrate film and then bonded to the inboard surface of the outboard-side glass plate (transparent plate) 1A forming part of the front windshield glass W, with a tape-like adhesive (not shown). The light-transmittable reflection film or layer 3 is formed at a part of the outboard surface of the outboard-side glass plate (transparent plate) 1A forming part of the front windshield glass W, under deposition of a metal thin film formed of Al, Au, Ag, Cu or the like.

Thereafter, the inboard-side glass plate 1B is temporarily bonded at its outboard surface to the inboard surface of the outboard-side glass plate 1A with the intermediate film or layer 4 (made of polyvinyl butyral or the like), so that the optical rotation layer 2 is located between the outboard-side glass plate 1A and the inboard-side glass plate 1B in such a manner that the optical rotation layer 2 is separate from the outboard-side surface of the inboard-side glass plate 1B, as clearly shown in FIG. 2. The inboard-side glass plate 1B defines thereinside the passenger compartment in which the driver (operator) and/or the vehicle passenger reside. It will be understood that the layer of the intermediate film 4 lies between the optical rotation layer 2 and the inboard-side glass plate 1B. Such a temporarily bonded structure is then subjected to a usual autoclave treatment, thereby obtaining the laminated glass 5 used for the automotive vehicle front windshield glass W.

The above-discussed laminated glass 5 is used as the automotive vehicle windshield glass W and forms part of the head-up display system S. The head-up display system S includes the displaying device or liquid crystal display 6. The liquid crystal display 6 generates the display light of information such as the driving information or the like. For example, the liquid crystal display 6 has the axis (plane) of polarization inclined about 45° leftward relative to the vertical axis on the image plate of the display light from the display 6. The second optical rotation layer 7 is attached or bonded on the front surface of the display 6 so as to rotate the plane of rotation of light from the display 6 by about 45° leftward, thereby transmitting P-wave having an axis (plane) of polarization inclined about 45° relative to the polarization axis on the image plane of the display 6, at Brewster's angle ($\theta$=about 56°) to the front windshield glass W. The P-wave has a direction of electric field, parallel with the surface of the inboard-side glass plate 1B.

With the thus arranged display system S, first the display light of information whose polarization axis (plane) is inclined about 45° leftward relative to the vertical axis on the image plane of the display 6 is output and incident on the second optical rotation layer 7 so as to be optically rotated by about 45° leftward to form P-wave. This P-wave reaches the inboard-side glass 1B, in which no reflection is made so as to allow a whole amount of the incident light or P-wave to income into the laminated glass 5. The P-wave reaches to and is rotated by the first optical rotation layer 2 by 90° so as to be converted into S-wave. Then, the S-wave reaches the outboard surface of the outboard-side glass plate 1A, upon which a part of the S-wave outgoes to the outside of outboard-side glass plate 1A while the other part is reflected by the light-transmittable reflection layer 3 and again passes through the first optical rotation layer 2 to be converted into P-wave. This P-wave reaches the inboard surface of the inboard-side glass plate 1B. At this time, the P-wave outcomes at Bewster's angle through the inboard surface of the inboard-side glass plate 1B, so that no reflection is made here. As a result, a whole amount of the P-wave can outcome toward the eye 8 so that the display information can be clearly recognized by the operator.

It will be understood that the light-transmittable reflection layer 3 is not necessarily required since light can be reflected by the outboard surface of the outboard-side glass plate 1A; however, an amount of light to be reflected to the side of the eye 8 will be reduced.

Figure 3:
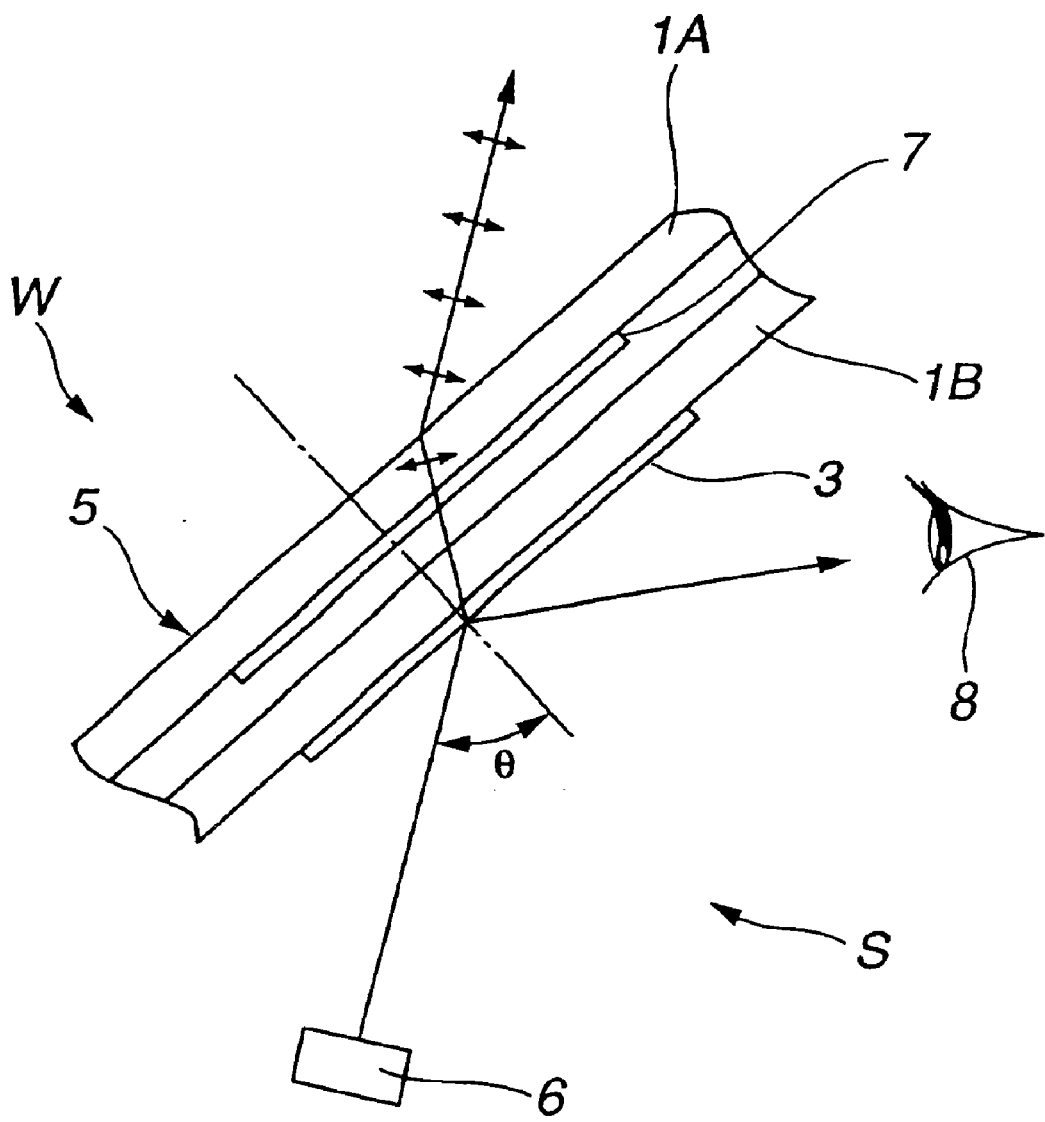
FIG. 3 is a fragmentary schematic sectional view of a third embodiment of the display system according to the present invention.

FIG. 3 illustrates a third embodiment of the display system S according to the present invention, similar to the first embodiment shown in FIG. 1. In this embodiment, the optical rotation layer 7 (capable of rotating the plane of polarization of light by about 45° to be incident thereon) formed in the same manner as in the first embodiment is removed from the substrate film and then bonded to the inboard surface of the outboard-side glass plate (transparent plate) 1A forming part of the front windshield glass W, with a tape-like adhesive (not shown). The light-transmittable reflection film or layer 3 is formed at a part of the inboard surface of the inboard-side glass plate (transparent plate) 1B forming part of the front windshield glass W, under deposition of a metal thin film formed of Al, Au, Ag, Cu or the like.

Thereafter, the inboard-side glass plate 1B is temporarily bonded at its outboard surface to the inboard surface of the outboard-side glass plate 1A with the intermediate film or layer 4 (made of polyvinyl butyral or the like), so that the optical rotation layer 7 is located between the outboard-side glass plate 1A and the inboard-side glass plate 1B in such a manner that the optical. rotation layer 7 is separate from the outboard-side surface of the inboard-side glass plate 1B, as clearly shown in FIG. 3. The inboard-side glass plate 1B defies thereinside the passenger compartment in which the driver (operator) and/or the vehicle passenger reside. It will be understood that the layer of the intermediate film 4 lies between the optical rotation layer 2 and the inboard-side glass plate 1B. Such a temporarily bonded structure is then subjected to a usual autoclave treatment, thereby obtaining the laminated glass 5 used for the automotive vehicle front windshield glass W.

The above-discussed laminated glass 5 is used as the automotive vehicle windshield glass W and forms part of the head-up display system S. The head-up display system S includes the displaying device or liquid crystal display 6. The displaying device 6 generates the display light of information such as the driving information or the like. In this embodiment, the liquid crystal display 6 is arranged to have the axis (plane) of polarization inclined about 45° rightward relative to the vertical axis on the image plate of the display 6, in which the display light from the display is incident on the laminated glass 5 at Brewster's angle ($\theta$=about 56°).

With the thus arranged display system S, first the display light of information whose polarization axis (plane) is inclined about 45° rightward relative to the vertical axis on the image plane of the display 6 is output and incident as it is on the inboard-side glass plate 1B. A part of the display light reaching the glass plate 1B is reflected on the surface of the light-transmittable reflection layer 3 and reaches the eye 8 of the operator or driver on the side of the liquid crystal display 6 so that the display information is clearly recognized by the operator. Another part of the display light entering the laminated glass 5 without reflection reaches the second optical rotation layer 7 so that a generally whole amount of it is optically rotated by about 45° to form P-wave. Then, this P-wave reaches and outgoes to the inboard surface of the outboard-side glass plate 1A at Brewster's angle, so that P-wave can be prevented from being reflected to the side of the eye 8 by the inboard surface of the outboard-side glass plate 1A. As a result, a whole amount of P-wave outgoes to the outboard side of the glass plate 1A without being reflected toward the eye 8 of the operator.

It will be understood that the light-transmittable reflection layer 3 is not necessarily required since light can be reflected by the inboard surface of the inboard-side glass plate 1B; however, an amount of light to be reflected to the side of the eye 8 will be reduced.

What is claimed is:

1. A display system comprising:
   a transparent plate;
   a liquid crystal display for generating a display light of information, said display light having a plane of polarization inclined by an angle of about 45° relative to a vertical axis of an image plane of said liquid crystal display, the display light being incident on a second surface of said transparent plate at Brewster's angle and reflected on a side of the second surface of transparent plate to be directed to an eye of an operator; and
   an optical rotation layer disposed to a first surface of said transparent plate, said optical rotation layer being adapted to receive the display light from said liquid crystal display and to optically rotate the plane of polarization of the display light from said liquid crystal display by an angle of about 45° and to allow P-polarized light to emanate therefrom.

2. A display system as claimed in claim 1, further comprising a light-transmittable reflection layer disposed on a second surface of said transparent plate, the display light from said liquid crystal display being reflected on said light-transmittable reflection layer and directed toward the eye of the operator.

* * * * *